United States Patent [19]

Dannels

[11] 4,082,712

[45] Apr. 4, 1978

[54] PROCESS FOR CURING SULFHYDRYL-TERMINATED THIOETHER POLYMERS

[75] Inventor: Bobby F. Dannels, Grand Island, N.Y.

[73] Assignee: Hooker Chemicals & Plastics Corporation, Niagara Falls, N.Y.

[21] Appl. No.: 755,885

[22] Filed: Dec. 30, 1976

Related U.S. Application Data

[63] Continuation-in-part of Ser. No. 554,816, Mar. 3, 1975, abandoned, which is a continuation-in-part of Ser. No. 535,632, Dec. 23, 1974, Pat. No. 3,992,274.

[51] Int. Cl.$^2$ ............................................. C08L 91/00
[52] U.S. Cl. .............................. 260/28 R; 204/159.18; 260/18 R; 260/23.3; 260/28.5 AS; 260/30.6 R; 260/31.2 R; 260/31.8 Z; 260/33.6 R; 260/33.6 UA; 260/33.8 R; 260/33.8 UA; 260/37 NP; 260/42.43; 260/42.46; 260/42.47; 260/79
[58] Field of Search ............... 260/79, 31.8 Z, 31.2 R, 260/37 NP, 30.6 R, 18 R, 33.6 R, 33.6 UA, 33.8 R, 28 R, 33.8 UA, 28.5 AS, 23.3, 42.43, 42.46, 42.47; 204/159.18

[56] References Cited

U.S. PATENT DOCUMENTS

| | | | |
|---|---|---|---|
| 3,522,221 | 7/1970 | Gardner et al. | 260/79 |
| 3,717,618 | 2/1973 | Oswald | 260/79 |
| 3,843,572 | 10/1974 | Morgan | 260/79 |
| 3,856,645 | 12/1974 | Morgan | 260/79 |

*Primary Examiner*—Melvyn I. Marquis
*Attorney, Agent, or Firm*—Peter F. Casella; James F. Mudd; David A. Stein

[57] ABSTRACT

An improved process for curing sulfhydryl-terminated thioether polymers substantially devoid of aliphatic unsaturation having a sulfhydryl functionality of 2 to 3 to obtain thioether elastomers is disclosed wherein the liquid thioether is reacted with a curing amount of tertiary butyl perbenzoate. Preferably the curing reaction is carried out at about ambient temperature in the presence of a copper, especially a divalent copper, promoter for the reaction. The improved curing process shortens the curing time and extends the effective working life of the curing reaction mixture. The cured products are of enhanced thermal stability and are useful as elastomeric sealants such as architectural sealants.

11 Claims, No Drawings

PROCESS FOR CURING SULFHYDRYL-TERMINATED THIOETHER POLYMERS

REFERENCE TO PRIOR APPLICATIONS

This is a continuation-in-part of copending application Ser. No. 554,816, filed Mar. 3, 1975 now abandoned, which in turn is a continuation-in-part of application Ser. No. 535,632, filed Dec. 23, 1974, now U.S. Pat. 3,992,274 issued Nov. 16, 1976.

BACKGROUND OF THE INVENTION

1. Field of the Invention

The invention relates to improvements in the manufacture of polythioether elastomers useful as sealants and more particularly it relates to an improved method of curing sulfhydryl terminated thioether polymers to obtain such elastomers. It is especially concerned with an improvement in curing such thioether polymers with an organic peroxy compound to provide thioether elastomers of enhanced thermal stability whereby the curing time is shortened and the effective working life of the curing reaction mixture is extended.

2. Description of the Prior Art

Sulfhydryl-terminated thioether polymers having an average functionality of 2 to 3 with respect to the sulfhydryl substituents, i.e. polymers with repeating alkylene monosulfide groups which contain 2 to 3 mercapto groups per polymer molecule, are the precursors of valuable elastomers useful as sealants, particularly architectural sealants are disclosed for example in I. G. Gardiner et al., U.S. Pat. No. 3,522,221, A. A. Oswald, U.S. Pat. No. 3,592,798, A. A. Oswald U.S. Pat. No. 3,717,618, my copending U.S. application Serial No. 501,716, filed Aug. 29, 1974, now abandoned, the continuation-in-part thereof, application Ser. No. 582,959, filed June 2, 1975 now Pat. No. 4,020,033, U.S. application Ser. No. 535,631, filed Dec. 23, 1974, to B. F. Dannels et al, now U.S. Pat. No. 3,992,289, issued Nov. 16, 1976, and the aforementioned U.S. Pat. No. 3,992,274.

Generally the sulfhydryl-terminated thioether polymers are prepared by polymerization of a dithiol or trithiol monomer and an unsaturated hydro-carbon containing at least one acetylenic bond or at least two ethylenic bonds per molecule.

As disclosed in the latter three applications the sulfhydryl terminated thioether polymers are generally liquid i.e. are at least fluid pastes, and can be cured by reaction with an inorganic or organic peroxy compound. The reaction is believed to involve oxidation of the terminal sulfhydryl, i.e. mercapto, substituents of the polymer to form disulfide linkages thereby cross linking the mono sulfide polymer chains to produce solid thioether elastomers. It is found that the inorganic peroxy compounds, such as lead dioxide, manganese dioxide and calcium peroxide, generally used in the preparation of these elastomers have several serious disadvantages which seriously limit their use as effective curing agents. For example, the inorganic peroxides are generally solids, insoluble in the liquid polythioether and hence they cannot be homogeneously dispersed in the liquid thioether polymer without prior comminution to a finely divided form and use of special dispersion equipment, e.g. paint mills, to evenly disperse the insoluble curing agent in the liquid thioether polymer substrate. Without the use of the foregoing inconvenient, expensive techniques and equipment, the inorganic peroxy compounds are unevenly dispersed in the liquid thioether polymers and elastomers obtained therefrom are unevenly cured resulting in serious structural weaknesses which limit their use as sealants, gaskets and the like.

Additionally during the curing reaction the inorganic peroxy compounds form inorganic salt residues. The latter remain in the cured elastomer and can catalyze degradation reactions in the cured product.

Moreover, many such inorganic peroxide compounds are highly colored, e.g. brown in the case of lead dioxide and black in the case of manganese dioxide, and introduce an undesirable coloration when employed as curing agents for the thioether elastomers. Accordingly, the use of lead dioxide and other colored inorganic peroxide compounds as curing agents is particularly undesirable where it is desired to prepare a substantially colorless thioether elastomer product or where it is desired to prepare a product of a particular color by use of a dye or pigmentary additive, i.e. said desired color in the product can be deleteriously affected in shade by the additional color introduced from the inorganic peroxy curing agent.

It is also known to use organic peroxy compounds for curing the liquid sulfhydryl-terminated thioether polymers to the corresponding thioether elastomers. Most of the known organic peroxy compounds have at least some degree of solubility in liquid sulfhydryl-terminated thioether polymers and hence their use as curing agents for the thioether polymers serves to overcome partially the disadvantages associated with the use of inorganic peroxy curing agents. However it has been discovered that the reaction of many organic peroxides with the liquid sulfhydryl-terminated thioether polymers is unacceptably slow. Additionally many organic peroxy compounds, on reaction with the thioether polymers, so rapidly convert the liquid polymer to a non-fluid liquid or paste which can not be worked or processed, that it is substantially impossible to process, i.e. mold, extrude or spread, the curing polymer mass after addition of the curing agent. In other words the organic peroxy reagents which are known to react with sulfhydryl compounds i.e. mercaptans, to form disulfide linkages on reaction with the present thioether polymers require extremely long time periods for curing the polymers or produce curing reaction masses which have insufficient effective working life, i.e. insufficient "pot-life". Moreover, many known organic peroxides when employed as curing agents for the liquid thioether polymers produce thermally unstable polymers. For example, U.S. Pat. No. 3,505,258 to J. R. Panek prescribes cumene hydroperoxide promoted by a copper salt in curing liquid sulfhydryl-terminated polysulfide polymers for extending the effective working life of the curing polymer mass. The liquid polysulfide polymers charged to the curing process of Panek are disulfide polymers and hence are structurally distinguished from the aforementioned liquid thioether polymers which are monosulfide polymers. The curing properties of such polysulfide polymers are also distinguished from those of the sulfhydryl-terminated thioether polymers since copper promoted cumene hydroperoxide provides curing masses of extremely insufficient effective working life when charged as curing agent to liquid thioether polymers devoid of disulfide linkages (as is illustrated by the results of Example 9 reported in Table 2 below). In addition to providing curing mixtures of inadequate pot-life copper-promoted cumene hydroperoxide also produces elastomers of insufficient thermal stability when employed as a curing agent for the liquid sulfhydryl-terminated monosulfide polymers as is illustrated by the results of Example 14 reported in Table 3 below.

SUMMARY OF THE INVENTION

The aforementioned disadvantages associated with prior art techniques for producing thioether elastomers from liquid sulfhydryl-terminated thioether polymers by curing with a peroxy compound are overcome by the present invention. The invention relates to a novel improvement in the process of preparing a thioether elastomer by reaction with an organic peroxy compound of a liquid sulfhydryl-terminated monosulfide thioether polymer substantially devoid of ethylenic and acetylenic unsaturation having a functionality of 2 to 3 sulfhydryl substituents per molecule curable therewith which improvement comprises reacting the liquid thioether polymer with a curing amount of tertiary butyl perbenzoate as the organic peroxy curing agent.

In general the amount of tertiary butyl perbenzoate employed in the improved process of the invention is about 5 to 15 parts per hundred parts by weight of the sulfhydryl-terminated thioether polymer.

It was surprising to discover according to the invention that liquid sulfhydryl-terminated thioether polymers are cured by the present novel curing technique to thioether elastomers of enhanced thermal stability (as shown by comparison of the results of Examples 11–13 with those of control Example 14 in Table 3 below). Moreover it was surprisingly discovered as shown in Table 1 below that the time required to cure the thioether polymer with the present organic perester curing agent is much shorter than the cure time attained in comparable reactions of the thioether polymer with other known organic peroxides, e.g. lauroyl peroxide and methyl ethyl ketone peroxide, which are generally considered to be more active peroxy compounds than tertiary butyl perbenzoate. Thus, the bulletin entitled "Half Life Time/Temperature Curves for Organic Peroxides and Age Compounds" published by AKZO Chemie bv, Amersfoort, The Netherlands, December 1973, p. 1 discloses that the half lives at 110° C of lauroyl peroxide and methyl ethyl ketone peroxide are only 2 minutes and 4 hours, respectively, while corresponding half life of tertiary butyl perbenzoate is 6 hours indicating the lower reactivity of the latter peroxy compound. In contrast, the tertiary butylperbenzoate cures a sulfhydryl-terminated polythioether in only about 15 minutes while comparable curing reactions using lauroyl peroxide and methyl ethyl ketone peroxide as curing agents are not even completed after 24 hours as shown by a comparison of Examples 3, 5 and 6 in Table 1 below.

Furthermore it was surprisingly discovered that curing mixtures of liquid sulfhydryl-terminated thioether polymer containing tertiary butyl perbenzoate as curing agent according to the invention had sufficiently extended effective working life, i.e. pot-life, to be easily processed e.g. molded, in contrast to the corresponding curing mixture containing cumene hydroperoxide as curing agent which had an unacceptably short effective working life of less than five minutes (as shown by the results of Examples 9, Parts A and B below and hence could not even be processed into test samples as disclosed in Example 14 below.

The curing agent of the invention is a substantially colorless organic compound which during the curing reaction does not form the deleterious salt residues of the type formed in curing the thioether polymer with inorganic peroxy compounds such as lead dioxide as explained hereinabove.

DETAILED DESCRIPTION OF THE INVENTION AND PREFERRED EMBODIMENTS THEREOF

The curing of liquid thioether polymer according to the invention is carried out in the presence of about 5 parts and preferably 6 to 10 parts of the tertiary butyl per benzoate per one hundred parts by weight of the liquid sulfhydryl-terminated thioether polymer. If desired, larger concentrations of the tertiary butyl perbenzoate can be employed, but amounts greater than about 15 parts of the perester per one hundred parts of the liquid sulfhydryl-terminated thioether polymer, while useful and effective, may be wasteful of the peroxy compound. Use of about 6 to 7 parts of the perester per hundred parts by weight of the liquid thioether polymer generally provides an especially good curing reaction.

While the curing reaction of the invention can be carried out at temperatures ranging from about 15° C, or even lower, say about 0° C, up to moderately elevated temperatures, e.g. about 125° C, it is especially convenient when employing the curing compositions as architectural sealants to employ curing temperatures of about 20° to about 40° C, more preferably of about 20° to about 30° C and especially about 25° C, i.e. ambient or room temperature.

In order to facilitate rapid cures in the latter especially preferred temperature range, it is preferable to carry out the curing reaction with a copper, preferably divalent copper, promoter for the peroxy compound. Suitable copper compounds suitable for promoting the curing reaction of the invention are, in general, members of the well-known class of metal organic compounds known in the art as "oil-soluble". Oil soluble metal compounds are characterized by being water insoluble and at least moderately soluble, i.e. soluble in excess of about one weight percent, in organic solvents such as benzene. The class of organic copper compounds referred to as being oil soluble are widely used as driers in paint manufacture and include metal soaps of organic acids, e.g. straight or branched chain, saturated or unsaturated monocarboxylic acids of 7 to 22 carbon atoms, as well as thiocarbamic acids including especially the N,N-bis-lower alkyl thiocarbamic acids wherein lower alkyl groups may be the same or different straight chain, branched chain or cyclic aliphatic hydrocarbon substituents of 1 to 8 carbon atoms.

Typical representative examples of suitable oil soluble divalent copper compounds include the following: copper carboxylic acid salts such as: copper stearate, copper naphthenate, copper tallate, copper 2-ethylhexanoate, copper linoleate, copper palmitate, copper oleate, copper 3,5,5-trimethylhexanoate, copper resinate, copper abietate, copper neodecanoate. Mixtures of these as well as equivalent copper oil soluble carboxylate compounds described in "Encyclopedia of Polymer Science and Technology," Interscience Publishers 1966 Vol. 5 p. 126–139, p. 224–225, the pertinent disclosure of which is incorporated herein by reference can also be used.

Other suitable oil soluble copper promoters include: copper thiocarbamate salts, e.g. copper dimethyl thiocarbamate, copper methyl ethyl thiocarbamate, copper di-n-butyl thiocarbamate, copper di-isopropyl thiocarbamate, copper salt of a mixture of dimethyl thiocarbamic acid, and diethyl thiocarbamic acid, copper bis-cyclohexyl thiocarbamate, copper di-n-octyl thiocarbamate.

Other oil soluble copper compounds useful in the present improved process include organic copper compounds such as copper acetylacetonate and equivalent organo-copper compounds, e.g. cupric hexoylacetonate or propionylacetonate described in J. H. Harewood, "Industrial Applications of the Organometallic Compounds," Rheinhold Publishing Corporation, 1963, p. 336-341, the pertinent disclosure whereof is incorporated herein by reference. Preferably the copper compound employed as promoter is a cupric bis-lower alkyl-thiocarbamate and especially is cupric dimethyl thiocarbamate.

The amount of copper promoter employed in accordance with the preferred embodiment of the invention can range from about 0.002 to about 2 parts per one hundred parts by weight of the liquid sulfhydryl-terminated thioether polymer. Preferably about 0.01 to about 1 part, more preferably about 0.01 to about 0.5 parts and especially about 0.1 to about 0.3 parts of copper promoter per one hundred parts by weight of the liquid sulfhydryl-terminated thioether polymer may be employed. The oil soluble copper compounds employed as promoters according to the invention are usually colored. Accordingly if it is desired to prepare a thioether elastomer devoid of color it is desirable to employ the copper promoter in an amount of 0.015 parts or less per one hundred parts by weight of the liquid sulfhydryl-terminated thioether polymer.

The liquid sulfhydryl-terminated thioether polymers which can be cured by reaction with tertiary butyl perbenzoate are a well known class of sulfur containing hydrocarbon polymer which can be prepared by free-radical polymerization of hydrocarbon dithiols or trithiols and unsaturated hydrocarbons having at least one acetylenic bond or at least two ethylenic bonds per molecule.

The hydrocarbon dithiols and trithiols employed as monomers in the polymerization have 1 to 20 carbon atoms in the hydrocarbon radicals which are saturated straight chain and branched chain alkyl radicals, cycloalkyl radicals, aryl radicals and aralkyl radicals. The hydrocarbon radicals of the dithiol and trithiol monomers may be further substituted with inert substituents such as halogen e.g. chlorine, bromine and fluorine, carbo-lower alkoxy, i.e. ester substituents, and carbonyl, e.g. keto substituents. Typical examples of suitable dithiols and trithiols useful as monomers in preparing the liquid sulfhydryl-terminated thioether polymer reactants of the present process include the following representative examples:

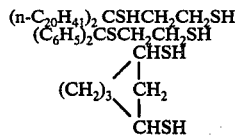

1,2,3-propane trithiol, 1,2,3-n-octane trithiol, 1,3-propane dithiol, 3-cyclopentyl-1,2-propane dithiol, 3-chloro-1,2-propane dithiol, 3-methyl 1,2-butane dithiol, 1,2,3-n-octyl trithiol, 1,3-propane dithiol, 1,4-n-butane dithiol, 1,6-hexane dithiol, 1,8-octane dithiol, 3-ethyl carbonyl-1,2-propane dithiol. Preferably the dithiol or trithiol is a lower alkylene group and is especially one having a terminal sulfhydryl group. Polymers prepared from a dithiol, especially a 1,2- or 1,3-dithiol, e.g. 1,2- and 1,3-propanedithiol, provide an especially good result according to the invention. In order to prepare colorless or low color thioether polymers it is especially desirable to employ 1,2- and 1,3- dithiols prepared by condensing hydrogen sulfide and allene compounds in a molar ratio of about 2:1 to 20:1 in the presence of ultraviolet light of wavelength substantially above about 2600 Angstrom units according to the disclosure of aforementioned U.S. Pat. No. 3,992,289, the pertinent subject matter of which is incorporated herein by reference. Preferably the 1,2- and 1,3- dithiols are prepared by carrying out the aforementioned hydrogen sulfide-allene compound condensation in the presence of an organic photosensitizing reagent for the reaction, e.g. acetophenone and benzaldehyde, as described in the aforementioned U.S. Pat. No. 3,992,274, the pertinent disclosure of which is incorporated herein by reference.

The unsaturated hydrocarbons employed in preparing liquid sulfhydrylterminated therether polymers for the present curing process contain at least one acetylenic bond or at least two ethylenic bonds. Generally the acetylenically unsaturated monomer will contain 2 to 50 carbon atoms and can be of mono-, di-. tri-, or higher functionality with respect to the unsaturated sites in the molecule. The ethylenically unsaturated reactant will contain 3 to 50 carbon atoms and be of di-, tri-, or higher functionality. The unsaturated reactant can contain both ethylenic and acetylenic unsaturation in the same molecule and may contain one or more halogan, e.g. fluorine, chlorine, and bromine, substituents attached either to a saturated or unsaturated carbon atom. Also the unsaturate may contain other conventional inert substituents such as ether groups, aryl substituents, such as phenyl, napthyl, and lower alkyl phenyl cycloalkyl substituents such as cyclopentyl, cyclohexyl and cyclododecyl and ester groups, i.e. carboxy-lower alkyl groups, such as carboxy methy. Cyclic, open chain, straight-chain and branched chain unsaturated compounds can be employed in the polymrization reaction.

Typical suitable unsaturated compounds for preparing the thioether polymer reactants of the present invention are listed in aforementioned U.S. Pat. Nos. 3,992,274 and 3,992,289, the pertinent disclosure of which patents is incorporated herein by reference. Preferred unsaturated monomers for preparing the present thioether polymer reactants contain up to 12 carbon atoms. Methyl acetylene is especially preferred as the acetylenic reactant and 1,2,4-trivinyl cyclohexane is especially preferred as the ethylenically unsaturated reactant.

The molar ratio of unsaturated reactant(s) to di- or trithiol reactant(s) charged to the polymerization reaction is generally about 0.7:1 to about 0.999:1. Molar ratios of unsaturated reactant to thiol reactant of exactly 1:1 or greater can be used but are desirably avoided since such ratios provide polythioethers which terminate in unsaturated groups rather than in sulfhydryl substituents, i.e. provide polythioethers which undesirably contain aliphatic unsaturation. Preferably the molar ratio of unsaturated compound(s) to di- or trithiol reactant(s) is about 0.85 to about 0.99.

The functionality of the liquid sulfhydryl terminated thioether polymer is 2.0 to 3.0 i.e. the polymer contains on the average 2 to 3 sulfhydryl, i.e. mercapto-, groups per molecule. Preferably the liquid sulfhydryl-terminated thioether polymers employed in the process of the invention have a functionality of 2.0 – 2.5, especially about 2.05 – 2.1. As is conventional in this art the functionality of the polymer is controlled by the relative proportion of dithiol and trithiol in the thiol reactant charged to the polymerization and/or by the relative proportion of monounsaturated hydrocarbon and polyunsaturated hydrocarbon in the unsaturated hydrocarbon reactant charged to the polymerization. Preferably liquid sulfhydryl-terminated thioether polymers employed in the present process are prepared employing a dithiol as the thiol reactant in the polymerization and a mixture of mono unsaturated acetylene and triunsaturated ethylenic hydrocarbon as the unsaturated reactant in the polymerization in order to control functionality of the polymer with the proportion of trifunctional unsaturated compound charged being about 0.0005 to 0.05, preferably about 0.005 to 0.03, moles per mole of the thiol reactant.

The polymerization reaction by which the present liquid thioether polymers are prepared can be carried out at temperatures of about $-100°$ C to $+175°$ C at pressures of about 1 to 10 atmospheres in the presence of conventional free radical initiators such as organic peroxides, azo compounds, gamma radiation and the like but is preferably initiated by light, particularly ultraviolet light and especially ultraviolet light of wave length substantially above about 2600 Angstroms as described in aforementioned copending application Ser. No. 535,631, the pertinent disclosure of which is incorporated herein by reference. Especially preferred sulfhydryl-terminated thioether polymers are prepared by carrying out the polymerization in the presence of the aforementioned ultraviolet light in the presence of a photosensitizing reagent as disclosed in aforementioned U.S. Pat. No. 3,992,289, the pertinent disclosure whereof is also incorporated herein by reference. Other suitable liquid sulfhydryl-terminated thioether polymers which are devoid of ethylenic or acetylenic unsaturation and are hence suitable for reactants in the improved curing process of the invention are disclosed, together with methods of preparing them, in the aforementioned U.S. Pat. Nos. 3,522,221 (Examples 4–9); 3,592,798 (Examples 1, 2 and 10); and 3,717,618 (Examples 1, 2 and 10); and my copending application Ser. No. 501,716, now-abandoned and the continuation-in-part application thereof, Ser. No. 582,959 now U.S. Pat. No. 4,020,033. The pertinent disclosure of these patents and the latter application are also incorporated herein by reference.

Sulfhydryl-terminated thioether polymers have number average molecular weights ranging from about 500 to about 1,000,000 or greater. In order to provide cured polymers which are elastomers and to insure that the curing reaction masses of the invention are relatively fluid and hence easily processed, I prefer to employ in the present invention sulfhydryl-terminated thioether polymers having a number average molecular weight in the range of about 1000 to about 12,000.

The curing mixtures of the invention and the cured elastomers prepared therefrom also contain, optionally, functional and/or decorative adjuvants such as organic plasticizers, organic adhesion improvers, inorganic fillers, reinforcing inorganic fillers and pigments. The amounts of each of these optional adjuvants, may in general range from about 0 to about 100 parts per one hundred parts by weight of the liquid sulfhydryl-terminated thioether polymer. Preferred amounts of filler, reinforcing filler, pigment, and plasticizer are, respectively, about 25 to 75 parts, about 25–75 parts, about 0–20 parts, and about 10–100 parts per one hundred parts of sulfhydryl-terminated thioether polymer. The adhesion improver is preferably employed in amounts ranging from about 0.1 to about 5 parts, more preferably about 0.2 to about 4 parts and especially about 1 to 2 parts per hundred parts by weight of the liquid sulfhydryl-terminated thioether polymer.

Organic materials which may optionally be incorporated in the curing mixtures of the invention as plasticizers include pine tar, soy bean oil and soy bean oil vulcanized with rubber maker's sulfur, dibutyl phthalate, phenyl cresyl phthalate, phenyl benzyl phthalate, butyl benzyl phthalate, dibutyl phenyl phosphate, tricresyl phosphate, butyl cyclohexyl phthalate, triphenyl phosphate, dibutyl phthalate, phenyl dicresyl phosphate, isooctyl diphenyl phosphate, di-2-ethylhexyl phenyl phosphate, diphenyl phthalate, dipropylene glycol dibenzoate, dibenzyl adipate, isodecyl diphenyl phosphate, isodecyl dicresyl phosphate, (butyl octyl) phosphate, tri-n-hexyl phosphate, butyl decyl phthalate, diisooctyl phthalate, di-2-ethylhexyl phthalate, di-n-octyl phthalate, di-n-octyl phenyl phosphate, di-2-ethylhexyl isophthalate, dibutoxyethyl adipate, dicapryl phthalate, diisodecyl phthalate, di-2-ethylhexyl hexahydrophthalate, di-n-nonyl phthalate, di-2-ethylhexyl terephthalate, hydrogenated terphenyl, di-n-decyl phthalate, dioctyl adipate, di-2-ethylhexyl azelate, alkyl aromatic hydrocarbons, ditridecyl phthalate, di-2-ethylhexyl sebacate, di-isodecyl adiphate, di-n-decyl adipate, dibutyl carbitol formal, dibutyl carbitol adipate, and castor oil, diethyl phthalate, ethyl phthalyl ethyl glycolate, dicyclohexyl phthalate, epoxized linseed oil, chlorinated biphenyls, coal tars, coumarone-indene resins and coumarone-indene resin/coal tar polymers, dibutoxyethoxylethyl adipate, dibutoxyethoxyethyl formate, terphenyl compounds, vaseline, aromatic petroleum hydrocarbons, polymerized aromatic petroleum resins and aromatic hydrocarbon oils, lower alkyl esters of chlorinated stearic acid such as pentachloromethyl stearate, and chlorinated paraffins containing from about 40 to 70 weight percent chlorine such as Chlorowax 50 manufactured by Diamond Shamrock Corp. Preferred plasticizers are benzyl phthalate esters, the chlorinated paraffins containing about 40 to 70 weight percent chlorine and pentachloromethyl stearate.

The pigment employed in the present compositions can be an organic pigment but is preferably an inert inorganic material. Materials suitable for use as inorganic pigments, fillers and reinforcing fillers according to the invention include bentonite, titanium dioxide, barium sulfate, carbon black, silica, zinc carbonate, zinc sulfide, magnesium silicate, calcium carbonate, calcium silicate, calcium sulfate, diatomaceous earth, iron oxide, magnesium silicate and zinc oxide. Preferably the pigment employed is titanium dioxide, the filler is ground calcium carbonate having particle sizes in the range of about 0.5 to 20 microns (average particle size about 3 to 6 microns) and the reinforcing filler is precipitated calcium carbonate having particle sizes in the range of about 0.03 to 0.15 microns (average particle size about 0.06 microns).

The adhesion improver, for the present compositions can be a phenolic resin, a modified phenolic resin (such as the proprietary modified phenolic resin manufactured by General Electric Corporation as Methylon resin) or a silane such as mercaptopropyl trimethoxysilane or gamma glycidoxypropyltrimethoxysilane. Preferably the adhesion improver employed is a silane, preferably gamma glycidoxypropyltrimethoxy silane or mercaptopropyltrimethoxy silane. An especially good result is obtained employing mercaptopropyltrimethoxy silane as the adhesion improving agent.

Curing of the liquid sulfhydryl-terminated thioether polymers can be carried out according to the invention by thoroughly mixing the liquid polymer and tertiary butyl perbenzoate, and allowing the mixture to cure to a thioether elastomer. Conveniently mixing of the liquid thioether polymer and the tertiary butyl perbenzoate is accomplished by manual stirring or agitation. When a copper promoter is charged to the curing process according to a preferred embodiment of the invention, the copper promoter is advantageously mixed into the curing mass directly after the latter is mixed with the perester curing agent. When it is desired to prepare elestomers containing one or more of the aforementioned functional and/or decorative adjuvants, the adjuvant or adjuvant mixture is charged to the liquid thioether polymer. The resulting mixture is mechanically milled conveniently in a paint mill, to obtain a homogeneous dispersion of the adjuvant(s) in the liquid polymer. The latter composition, a fluid paste, i.e. a resin paste, may be packaged out and/or stored for later admixture with the perester curing agent and promoter at the side at which it is desired to cure the liquid thioether polymer to an elastomer.

When the adhesion improver employed in the present composition is a silane, it is desirable to dry the resin paste before incorporation therein of the silane since the latter organic silicon compounds are susceptable to hydrolysis by any moisture in the resin paste. Drying is advantageously accomplished by blending the resin paste with a small proportion, e.g. about two percent based on the weight of the resin paste, of a particulate molecular sieve, e.g. Linde Type 4A molecule sieve (manufactured by Linde Div. of Union Carbide Corp.) and allowing the resultant mixture to stand about 24 hours before addition of the silane adhesion improver. The resultant resin paste containing both molecular sieve and silane adhesion improver processes an excellent stability substantially, equivalent, at least, to that of resin paste devoid of silane and drying agent.

The curing of liquid sulfydryl-terminated thioether polymers to elastomers by tertiary butyl perbonzoate according to the invention is accomplished rapidly but nevertheless the curing mixtures retain their fluidity for a sufficient period to permit processing or working e.g. molding, extruding and spreading, of the curing compositions.

The thioether elastomers produced by the present process are distinguished from thioether elastomers cured by other peroxy compounds, e.g. cumene hydroperoxide, by their thermal stability, especially their ability to retain their elasticity and other physical properties in exposure to elevated temperatures. The improved stability of the present elastomers renders these novel materials particularly suitable for use as sealants especially architectural sealants, e.g. for use in filling and sealing joints and seams, in many areas of construction including glass windows, floors and pavements. Elastomers substantially devoid of discoloration which can be prepared according to preferred embodiments of the invention are especially useful in architectural applications wherein seals devoid of discoloration are especially desirable.

Curing of liquid sulfhydryl-terminated thioether polymers according to the improved procedure of the invention does not require special mixing equipment to incorporate the curing agent evenly in the liquid polymer and also does not require comminution of the curing agent prior to use in the curing reaction.

In addition to the foregoing commercial applications the elastomers and rubbers prepared by curing the liquid thioether polymers according to improved technique of the invention can also be employed as printing rollers and gaskets.

The following examples serve to illustrate the various aspects of the invention but are not intended to limit it. Where not otherwise noted throughout this specification and claims, parts, percentages and proportions are by weight and temperatures are in degrees centigrade.

EXAMPLE 1

Preparation of Alkylene Dithiol Monomer

A 1.5 gallon steel glass-lined pressure vessel with a nickel head and a 55 mm. outside diameter quartz light well is equipped with pressure sensors, a thermocouple and a Chemical Pyrex (7750 Pyrex manufactured by the Corning Glass Co.) filter inserted in the light well. A 450 watt medium pressure mercury vapor arc (Hanovia Model 679A-36 ultraviolet lamp) is placed within the light well through which nitrogen gas coolant is circulated. The reaction vessel is cooled to about −20° in a refrigerated aqueous ethylene glycol bath. Hydrogen sulfide and allene in a molar ratio of about 10.5:1 and about one gram (0.00094 mole corresponding to about 0.03% based on the weight of the reaction mixture) of benzaldehyde are charged to the vessel which is sealed.

The mercury vapor lamp is switched on and allowed to irradiate the reaction mass for about 7 hours during which the reaction temperature is between about −20° and +3° and the reaction pressure is about 110 to 210 p.s.i.g. The reaction vessel is then vented to a receiver at atmospheric pressure which is cooled to about −60° in a dry ice-acetone bath in order to recover hydrogen sulfide and any unreacted allene. There is thus obtained 1843 grams (corresponding to about 97% conversion based on allene) of a clear colorless crude reaction mixture which is stripped of volatiles, e.g. residual hydrogen sulfide and traces of allyl mercaptan, by heating for one hour at about 100° under a diminished pressure of about 25 mm. of mercury. The resultant crude colorless reaction mass is predominantly 1,3-propanedithiol with minor amounts i.e. about 30 to 50% of sulfhydryl-terminated monothioether, sulfhydryl-terminated polythioether oligomers and 1,2-propanedithiol.

A substantially similar excellent clear colorless crude reaction mixture containing 1,3-propane dithiol as predominant product can be obtained by replacing the Pyrex light well filter in the above reaction with one of Corex (9700 Corex manufactured by the Corning Glass Co.). A similar excellent crude product is also obtained when the benzaldehyde is replaced by acetophenone or benzophenone.

The composition of 7740 Pyrex glass is 81% $SiO_2$, 13% $B_2O_3$, 4% $Na_2O$ and 2% $Al_2O_3$.

The composition of 9700 Corex glass is 80% $SiO_2$, 13% $B_2O_3$, 5% $Na_2O$ and 2% $Al_2O_3$.

EXAMPLE 2

Preparation of Sulfhydryl-Terminated Thioether Polymer

A Chemical Pyrex round bottomed flask fitted with a stirrer, thermometer, gas inlet tube and dry ice reflux condenser is flushed with nitrogen and charged with a vacuum stripped crude reaction mixture (1257.2 grams, about 11.6 moles, computed as 1,3 propanedithiol) prepared by a procedure substantially similar to that of Example 1, 9.43 grams (0.058 mole) of 1,2,4 trivinylcyclohexane and 2.33 grams (0.022 moles of benzaldehyde). A 100 watt medium pressure mercury arc lamp of the type described above is positioned horizontally 4 inches beneath the flask is allowed to illuminate the stirred reaction mixture for 30 minutes. The reaction mass is then saturated with methylacetylene charged through the gas inlet tube beneath the surface of the reaction mass which is maintained at a temperature of about 40°–58° at atmospheric pressure. The methyl acetylene addition is continued at a rate sufficient to maintain slight reflux in the reaction mixture. After 10.5 hours 372 grams (9.34 moles) of methyl acetylene has reacted. The liquid bis-sulfhydryl-terminated polythioether (1641 grams) is poured from the reaction flask and heated to about 200° under a diminished pressure of about 0.05 mm mercury for about 4 hours to strip off any volatiles such as low molecular weight cyclic polythioethers. The vacuum stripped liquid polymer has a viscosity of 870 poises indicating a number average molecular weight of about 5700 and is substantially clear, colorless.

EXAMPLE 3

|  | Parts |
|---|---|
| Sulfhydryl-Terminated Polythioether (Note 1) | 200 |
| Precipitated calcium carbonate (Note 2) | 100 |
| Ground calcium carbonate (Note 3) | 80 |
| Titanium dioxide (Note 4) | 20 |
| Organic Ester Plasticizer (Note 5) | 100 |

(Note 1) A polythioether having monosulfide linkages and an average of 2.1 sulfhydryl groups per polymer molecule, a number average molecular weight of 3625 and a viscosity of 420 poises which is prepared substantially as described in Example 2 above except that 0.5 mole percent of the trivinyl cyclohexane is charged to the polymerization.
(Note 2) A reinforcing filler manufactured by Diamond Shamrock Chemical Co. as Multifex MM.
(Note 3) A filler manufactured by White Pigment Corporation as Duramite.
(Note 4) Pigment maufactured by NL Industries as Titanox RA-40.
(Note 5) Benzyl type phthalate ester manufactured by Monsanto Co. as Santicizer 278.

At ambient temperature a mixture of the above listed ingredients is blended by passing the mixture three times through a three roll paint mill. To 5 parts of the resulting resin paste is charged 0.2 parts (corresponding to 10 parts per 100 parts of sulfhydryl-terminated polythioether) of tertiary butyl perbenzoate and the resulting mixture is thoroughly mixed by manual agitation. The resulting mixture is allowed to stand at ambient temperature for 24 hours, during which no change is observed in the mixture. To the mixture is then added one drop of a solution of 5 parts of cupric dimethyl thiocarbamate (manufactured by R. L. Vanderbilt Co. as Cumate) in 6 parts by volume of benzene (corresponding to 0.00417 parts of the cupric compound or 0.219 parts of the copper compound per 100 parts of the sulfhydryl-terminated thioether polymer). After the copper compound and the resin paste containing the perester have been thoroughly mixed, by manual agitation, the mixture is allowed to stand at ambient temperature, and the time i.e. cure time, elapsing from completion of the latter mixing operation to solidification of the mixture into an elastomer is noted. The mixture is observed to cure an excellent polythioether elastomer in only about 15 minutes.

EXAMPLES 4–7 (CONTROLS)

The procedure of Example 3 is repeated as described except that in place of the tertiary butyl perbenzoate there is employed the same proportion of other organic and inorganic peroxy compounds. The results of these examples are compared with those of Example 3 in Table 1 below.

Table 1

| Example | Peroxy Compound | Cure Time |
|---|---|---|
| 3 | tertiary butyl perbenzoate | 15 minutes |
| 4 | dicumyl peroxide | 24 hours |
| 5 | lauroyl peroxide | No cure in 24 hours |
| 6 | methyl ethyl ketone peroxide | No cure in 24 hours |
| 7 | concentrated hydrogen peroxide (30% solution in water) | No cure in 24 hours |

|  | Example 8 Parts |
|---|---|
| Sulfhydryl Terminated Polythioether as in Example 3 | 100 |
| Precipitated calcium carbonate as in Example 3 | 50 |
| Ground calcium carbonate as in Example 3 | 40 |
| Titanium dioxide as in Example 3 | ;0 |
| Organic Ester Plastizicer as in Example 3 | 50 |

A resin paste is prepared from the above-listed ingredients substantially as described in Example 3. Equal portions, denoted Part A and Part B, of the resulting resin paste are then each blended with 6.5 parts per 100 parts of the polythioether of tertiary butyl perbenzoate according to the procedure of Example 3. Part A of the resin pasteperester mixture is admixed with solid cupric dimethyl thiocarbamate charged in a concentration of 0.15 parts per 100 parts of polythioether while Part B is admixed with solid cupric dimethyl thiocarbamate in a concentration of 0.3 parts of copper compound per 100 parts of polythioether. The resulting mixtures A and B are allowed to stand at ambient temperature, the time elapsing from completion of the mixing of the copper compound with the resin paste-peroxide mass to the time at which each liquid mixture becomes non-fluid, i.e. becomes non-spreadable and/or non-extrudable is observed to determine the effective working life, i.e. pot life, of each curing mixture. The results of these experiments is reported in Table 2 below.

EXAMPLE 9 (CONTROL)

The procedure of Example 8 is repeated substantially as described except that cumene hydroperoxide (6.5 parts per 100 parts of sulfhydryl-terminated polythioether) is substituted for the tertiary butyl perbenzoate The results of these experiments are compared with those of Example 8 in Table 2 below.

EXAMPLE 10 (CONTROL)

The procedure of Example 8 is repeated substantially as described except that benzoyl peroxide (charged at a concentration of about 7 parts per hundred parts of sulfhydryl-terminated polythioether) is employed in place of the tertiary butyl perbenzoate. Since no reaction occurs on admixing the resin paste-peroxide mixture with the copper compound at a concentration of 0.3 parts copper dimethyl thiocarbamate per 100 parts of polythioether, no attempt is made to react the resin paste-peroxide mixture in the presence of 0.15 parts of the copper compound per 100 parts of polythioether, or in the presence of 6.5 parts of peroxide per 100 parts of polythioether. The results of this example are compared with those of Examples 8 and 9 in Table 2 below.

Table 2

| Example | Peroxy Compound (Conc. in parts per 100 parts polythioether) | Effective Working Life of Curing Mixture (in minutes) |
|---|---|---|
| 8. Part A * | Tertiary butyl perbenzoate (6.5) | 45 |
| Part B ** | Tertiary butyl perbenzoate (6.5) | 25 |
| 9. Part A * | Cumene hydroperoxide (6.5) | less than 5 |
| Part B ** | Cumene hydroperoxide (6.5) | less than 5 |
| 10. ** | Benzoyl peroxide (7) | No reaction occurs |

* In the presence of 0.15 parts of cupric dimethyl thiocarbamate per 100 parts of the sulfhydryl-terminated polythioether.
** In the presence of 0.3 parts of cupric dimethyl thiocarbamate per 100 parts of the sulfhydryl-terminated.

EXAMPLE 11

The procedure of Example 8, Part A, is repeated substantially as described in preparing a resin paste-tertiary butyl perbenzoate - copper dimethyl thiocarbamate mixture containing 6.5 parts of the perester per 100 parts polythioether and 0.3 parts copper dimethyl thiocarbamate per 100 parts of the polythioether. The liquid mixture is molded into panels 4 inches, length, by 4 inches, width, by 1/16 inch, thickness, and the resulting casts are allowed to cure into elastomers at ambient temperature as described in Example 3. The cured panels are tested for mechanical properties, i.e. Tensile Modulus, Rupture (Tensile Strength) and Percent Elongation according to the testing procedure of A.S.T.M.D-412.

The panels are also weighed and subjected to accelerated ageing at 150° for an extended period after which they are reweighed and retested for loss of weight and mechanical properties, respectively, in order to determine the thermal stability of the cured elastomer.

The results of this experiment are summarized in Table 3 below.

EXAMPLE 12

The procedure of Example 11 is repeated substantially as described except that 0.2 parts per 100 parts of sulfhydryl-terminated polythioether of mercaptopropyltrimethoxysilane (an adhesion improver manufactured by Union Carbide Corp. as Silane A-187) is admixed with the resin paste before addition of the tertiary butyl perbenzoate and the cupric dimethyl thiocarbamate and the test panels of cured elastomer are subjected to accelerated ageing at both 125° and 150°.

The results of these experiments are compared with the results of Example 11 in Table 3 below.

EXAMPLE 13

The procedure of Example 12 is repeated substantially as described except that in place of the mercaptopropyltrimethoxysilane adhesion improver there is added gamma glycidoxypropyl trimethoxy-silane (an adhesion improver manufactured by Union Carbide Corp. as Silane A-187). The results of this example are compared with those of Example 11 and 12 in Table 3 below.

EXAMPLE 14 (CONTROL)

The procedure of Example 11 is repeated substantially as described except that cumene hydroperoxide is used in place of tertiary butyl perbenzoate, the copper dimethyl thiocarbamate is charged as a 1% solution in about 1 part of the liquid polythioether and the concentration of the copper dimethyl thiocarbamate is lowered to 0.015 parts per 100 parts of sulfhydryl-terminated polythioether. The latter procedural change is required when employing the cumene hydroperoxide as curing agent in order to provide sufficient effective working time to mold the test panels. The accelerated ageing test of the test panels is carried out only at 125° since the thermal instability of the cured elastomer which is observed at the latter temperature obviates the necessity of testing the samples at any higher temperature. The results of this example are compared with the results of Examples 11-13 in Table 3 below.

TABLE 3

| Example | Tensile Modulus (lbs./sq. in.) 100% | Tensile Modulus (lbs./sq. in.) 300% | Rupture: Tensile Strength (lbs./sq. in.) | % Elongation | Duration (in days) of retention of Mechanical Properties (and % weight Loss on Ageing) at: 125° | Duration (in days) of retention of Mechanical Properties (and % weight Loss on Ageing) at: 150° |
|---|---|---|---|---|---|---|
| 11 | 75 | 113 | 242 | 857 | — | 2(12%) |
| 12 | 48 | 80 | 199 | 696 | 14(5.5%) | 3(17%) |
| 13 | 113 | — | 214 | 256 | 14(6.8%) | 3(13%) |
| 14 (Control) | — | — | — | — | 1*(8.4%) | — |

*The panel on ageing for only one day at 125° not only loses strength, but also decomposes to a useless mass of nonelastomeric putty.

It is to be understood that the invention is not limited to the specific examples which have been offered merely as illustrative and that modifications can be made without departing from the spirit of the invention.

What is claimed is:

1. In the process of preparing a thioether elastomer by reaction of an organic peroxy compound with a liquid sulfhydryl-terminated monosulfide thioether polymer substantially devoid of ethylenic and acetylenic unsaturation having a functionality of 2 to 3 sulfhydryl substituents per molecule which is curable therewith, the improvement which comprises carrying out the reaction in the presence of a curing amount, corresponding to at least about 5 parts by weight per one hundred parts by weight of he liquid thioether polymer, of tertiary butyl perbenzoate as the organic peroxy compound.

2. The method of claim 1 wherein the liquid thioether polymer is prepared by polymerizing a hydrocarbon dithiol with an unsaturated hydrocarbon having at least one acetylenic bond or at least two ethylenic bonds per molecule and the curing reaction is carried out at about 20° – 40° C. in the presence of a small effective amount of an oil-soluble organic copper promoter for the curing reaction.

3. The method of claim 2 wherein the liquid polymer has a functionality of 2.0 – 2.5, and is prepared from a dithiol and an unsaturated hydrocarbon selected from the group consisting of monofunctional acetylenically unsaturated hydrocarbons and a trifunctional ethylenically unsaturated hydrocarbon, the molar ration of unsaturated reactants to dithiol being about 0.7:1 to 0.999:1, the perbenzoate is employed in a concentration of about 5 to 10 parts per hundred parts by weight of the liquid thioether polymer, the copper promoter is an oil soluble organic cupric compound employed in a concentration of about 0.01 – 1.0 parts per hundred parts by weight of the liquid thioether polymer and the curing reaction is carried out at about 20° – 30° C.

4. The method of claim 3 wherein the liquid polymer has a number average molecular weight of 1,000 to 12,000 and is prepared from a dithiol having a terminal sulfhydryl substituent and a mixture of a monofunctional acetylenic unsaturated hydrocarbon and trifunctional ethyleniclly unsaturated hydrocarbon wherein the proportion of trifunctional compound is about 0.0005 to 0.05 mole per mole of the dithiol, the perbenzoate is employed in a concentration of about 6 to 7 parts per hundred parts by weight of the liquid thioether polymer and the copper promoter is a cupric bisalkyl thiocarbamate employed in a concentration of about 0.01 to 0.5 parts per hundred parts by weight of the liquid thioether polymer.

5. The method of claim 4 wherein the dithiol is propane dithiol, the monofunctional acetylenically unsaturated compound is methyl acetylene, the trifunctionl ethylenically unsaturated compounds is 1,2,4-trivinyl cyclohexane, the alkyl groups of the cupric bis-alkyl thiocarbamate are lower aliphatic hydrocarbon substituents and the copper promoter is present in a concentration of about 0.1 to 0.3 parts per hundred parts of liquid thioether polymer.

6. The method of claim 5 wherein the functionality of the thioether polymer is 2.05 to 2.1 the copper compound is cupric dimethyl thiocarbamate, and the curing reaction is carried out in the presence of a functional and/or decorative polymer adjuvant selected from the group consisting of filler, reinforcing filler, pigment, organic plasticizer and organic adhesion improver, each adjuvant having a concentration in the range of about 0 to 100 parts per hundred parts by weight of the liquid thioether polymer.

7. The method of claim 6 wherein the fillers are water insoluble inorganic compounds each employed in a concentration of about 25 – 75 parts per hundred parts by weight of the liquid thioether polymer, the pigment is an inorganic pigment employed in a concentration of about 0 to 20 parts per hundred parts by weight of the liquid thioether polymer, the organic plasticizer is employed in a concentration of about 10 to 100 parts per hundred parts of the liquid thioether polymer and the organic adhesion improver is selected from the group consisting of mercaptopropyltrimethoxy silane and the gamma glycidoxypropyltrimethoxy silane and is employed in a concentration of about 0.1 to 5 parts per hundred parts of the thioether polymer.

8. The method of claim 7 wherein the filler is ground calcium carbonate, the reinforcing filler is precipitated calcium carbonate, the pigment is titanium dioxide, the plasticizer is selected from the group consisting of benzyl phthlate esters, chlorinated paraffins containing from about 40 to 70% chlorine by weight; and pentachloromethylstearate, and the organic adhesion improver is mercaptopropyltrimethoxy silane employed in a concentration of about 0.2 to 4 parts per hundred parts of the liquid thioether polymer.

9. A cured thioether elastomer prepared by the method of claim 1.

10. A cured thioether elastomer prepared by the method of claim 8.

11. An improved process for curing a liquid sulfhydryl-terminated monosulfide thioether polymer substantially devoid of ethylenic and acetylenic unsaturation having a functionality of 2 to 3 sulfhydryl substituents per molecule prepared by polymerizing a hydrocarbon dithiol or trithiol with an unsaturated hydrocarbon having at least one acetylenic bond or at least two ethylenic bonds per molecule, which comprises reacting the liquid thioether polymer with a curing amount corresponding to at least about 5 parts by weight per one hundred parts by weight of the liquid thioether polymer of a tertiary butyl perbenzoate.

* * * * *